United States Patent
Goodson et al.

(10) Patent No.: US 8,854,943 B2
(45) Date of Patent: *Oct. 7, 2014

(54) SYSTEMS AND METHODS FOR ADJUSTING TIME SLOTS OF VECTORING STREAMS BASED ON BIT LOADING

(75) Inventors: Richard Goodson, Huntsville, AL (US); Arlynn Wayne Wilson, Huntsville, AL (US); Fred Chu, Madison, AL (US); Kevin W. Schneider, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/411,378

(22) Filed: Mar. 2, 2012

(65) Prior Publication Data

US 2012/0250491 A1    Oct. 4, 2012

Related U.S. Application Data

(60) Provisional application No. 61/448,546, filed on Mar. 2, 2012.

(51) Int. Cl.
| | |
|---|---|
| H04W 24/02 | (2009.01) |
| H04M 3/18 | (2006.01) |
| H04B 3/32 | (2006.01) |
| H04M 3/34 | (2006.01) |
| H04L 12/70 | (2013.01) |
| H04M 3/30 | (2006.01) |

(52) U.S. Cl.
CPC ............. *H04M 3/18* (2013.01); *H04W 24/02* (2013.01); *H04L 2012/5675* (2013.01); *H04B 3/32* (2013.01); *H04M 3/306* (2013.01); *H04M 3/34* (2013.01)

USPC .......................................... 370/201; 370/222

(58) Field of Classification Search
CPC ................... H04I 2012/5675; H04W 24/02
USPC .............. 370/201, 222–224, 359, 419, 242; 379/27.01, 417
See application file for complete search history.

(56) References Cited

U.S. PATENT DOCUMENTS

| | | | |
|---|---|---|---|
| 7,835,368 B2 | 11/2010 | Duvaut et al. | |
| 8,605,567 B2 | 12/2013 | Wilkes et al. | |
| 2003/0086514 A1* | 5/2003 | Ginis et al. ................. | 375/346 |
| 2003/0158928 A1 | 8/2003 | Knox et al. | |
| 2004/0095907 A1 | 5/2004 | Agee et al. | |

(Continued)

FOREIGN PATENT DOCUMENTS

| | | | |
|---|---|---|---|
| EP | 2 464 026 | * | 10/2013 |
| WO | WO 2009/152188 | * | 12/2009 |

*Primary Examiner* — Man Phan
*Assistant Examiner* — Mewale Ambaye
(74) *Attorney, Agent, or Firm* — Maynard Cooper & Gale, P.C.; Jon E. Holland

(57) ABSTRACT

A communication system comprises a plurality of line cards having transceivers coupled to a plurality of subscriber lines. Each line card has at least one transceiver within the same vectoring group, and each line card also has vector logic capable of cancelling crosstalk induced by a tone communicated by any member of the vector group. Further, the line cards are coupled to one another via a data connection across which a vectoring stream carrying vectoring information from one line card to the next. The bandwidth of the vectoring stream is reduced by dynamically adjusting time slots of the vectoring stream based on bit loading for the communicated tones.

13 Claims, 6 Drawing Sheets

(56) References Cited

U.S. PATENT DOCUMENTS

| | | |
|---|---|---|
| 2005/0220178 A1 | 10/2005 | Ginis |
| 2008/0151863 A1* | 6/2008 | Lawrence et al. ............ 370/351 |
| 2009/0245340 A1 | 10/2009 | Sorbara et al. |
| 2009/0257581 A1 | 10/2009 | Biyani et al. |
| 2010/0034374 A1 | 2/2010 | Ohman et al. |
| 2010/0195817 A1 | 8/2010 | Cendrillon et al. |
| 2010/0272164 A1 | 10/2010 | Schelstraete et al. |
| 2011/0080938 A1 | 4/2011 | Fisher et al. |

* cited by examiner

SYSTEMS AND METHODS FOR ADJUSTING TIME SLOTS OF VECTORING STREAMS BASED ON BIT LOADING

CROSS REFERENCE TO RELATED APPLICATION

This application claims priority to U.S. Patent Application No. 61/448,546, entitled "Generalized Vectoring Architecture" and filed on Mar. 2, 2011, which is incorporated herein by reference.

RELATED ART

A digital subscriber line access multiplexer (DSLAM) is a device that connects multiple subscriber lines to a high-speed network line using digital subscriber line (DSL) modulation formats across the subscriber lines. In the downstream direction, a DSLAM generally demultiplexes a high-speed data stream from a network across the subscriber lines, and in the upstream direction, a DSLAM generally multiplexes the data streams from the subscriber lines for transmission across the high-speed network line. A DSLAM can be installed at a variety of locations, such as at a network facility (e.g., a central office) or an intermediate point between a central office and one or more customer premises.

A variety of DSL formats have been used for the communication from a DSLAM to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbit/s) downstream and about 16 Mbit/s upstream. Second generation VDSL, sometimes referred to as VDSL2, provides up to about 100 Mbit/s simultaneously in the both the upstream and downstream directions. The VDSL line code is discrete multi-tone (DMT) modulation, which uses a sequence of equally spaced frequencies or tones, each of which is modulated using quadrature amplitude modulation (QAM).

Like several other DSL technologies, VDSL suffers from the effects of crosstalk. However, VDSL standards specify vectoring techniques that allow crosstalk cancellation, and such techniques have been employed to cancel the crosstalk among subscriber lines extending from a DSLAM to one or more customer premises in an effort to improve the performance of VDSL signals and allow for longer reaches. However, VDSL vectoring is processing intensive, and as the number of subscriber lines increases, the amount of processing required to cancel crosstalk from the signals carried by the subscriber lines increases exponentially.

In this regard, to cancel crosstalk, vector logic (sometimes referred to as a "vector engine") maintains a set of vectoring coefficients respectively corresponding to the coupling functions between interfering tones (i.e., tones that induce crosstalk) and victim tones (i.e., tones affected by crosstalk). For each victim tone, the vector engine combines the symbol of the victim tone and each interfering tone with its corresponding vectoring coefficient, and the result becomes the new victim tone. In such manner, the crosstalk channel is effectively inverted, and the crosstalk is cancelled tone-by-tone for all tones. For transmitter-based precoding, the new victim tone is transmitted on the line, and the precoding effectively cancels the crosstalk as the victim tone propagates across the line and the crosstalk couples into the line of the victim tone. For receiver-based cancellation, the new tone is further processed by the receiver but with reduced crosstalk.

A single vector engine can process the coefficients for a limited number of tones, but additional vector engines can be added in order to increase the number of tones subject to the VDSL vectoring. In such case, the vector engines share vectoring information (e.g., tone symbols) so that a larger number of interfering tones can be canceled from each victim tone.

When a vectoring group spans across multiple line cards, the vectoring information should be communicated among the line cards. Reliably communicating vectoring information among multiple line cards can be problematic, particularly for vectoring groups that process a large number of tones thereby generating a large amount of vectoring information.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
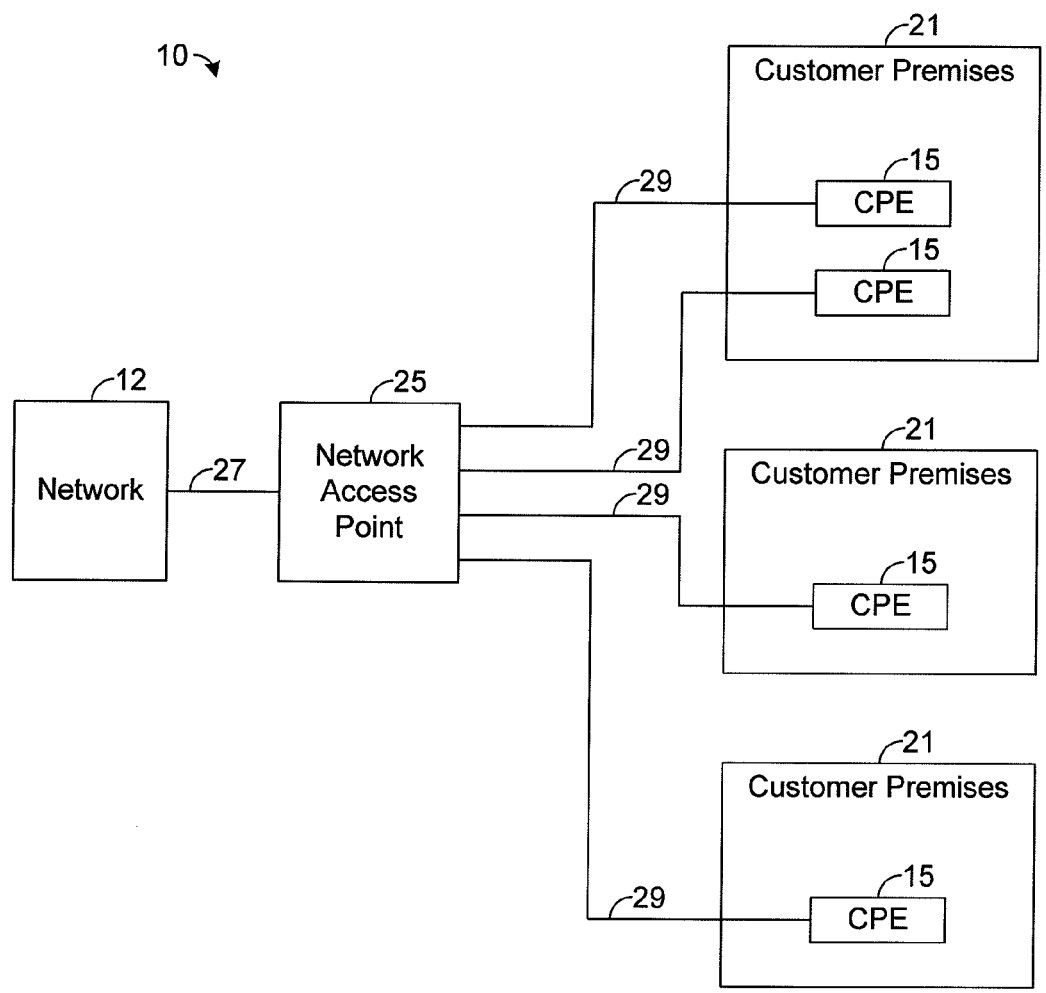
FIG. 1 is a block diagram illustrating an exemplary embodiment of a communication system.

The present disclosure generally pertains to systems and methods for communicating vectoring information for multi-card vectoring groups. In one exemplary embodiment, a communication system comprises a plurality of line cards having transceivers coupled to a plurality of subscriber lines. Each line card has at least one active transceiver within the vectoring group, and each line card also has vector logic capable of cancelling crosstalk induced by an active transceiver that is a member of the vectoring group. Further, the line cards are coupled to one another via a data connection across which vectoring information is passed between line cards. In this regard, the data connection carries one or more data streams, referred to hereafter as a "vectoring stream," having a plurality of time slots respectively allocated to the line cards. As the vectoring stream is communicated, each line card inserts vectoring information (e.g., the symbols received by such line card from the subscriber lines or to be transmitted by such line card across the subscriber lines) into the time slots allocated to it. Further, each line card reads the vectoring information of other line cards from the time slots allocated to the other line cards. Accordingly, the vector logic on a given line card has sufficient access to the vectoring information of the other line cards to cancel crosstalk induced by interfering tones communicated across any of the subscriber lines regardless of which line cards receive or transmit the interfering tones.

It is generally desirable to reduce the amount of data that is communicated among the cards in order to help reduce the complexity and data requirements of the communication system. In one exemplary embodiment, the sizes of time slots of the vectoring stream are dynamically changed depending on the sizes of the symbols communicated by the vectoring stream. In this regard, during communication in a DMT system, transceivers from time-to-time adjust the bit loading for various tones as line conditions change. As an example, if the signal-to-noise (SNR) ratio for a given tone increases, the bit loading might be increased to provide a higher data rate for the tone. If the SNR ratio for the tone decreases, the bit loading might be decreased to provide a reduced data rate and, hence, to reduce errors that otherwise might result from deteriorating line conditions.

Reducing the bit loading for a given tone allows a reduction in the size of symbols communicated in the vectoring stream for such tone. When the bit loading for a tone is changed, the size of the time slot in the vectoring stream corresponding to the tone is dynamically updated to accommodate the new symbol size. For example, when the bit loading of a tone is decreased, the size of the corresponding time slot in the vectoring stream is decreased, thereby reducing the overall data requirements for the vectoring stream. However, when the bit loading of the tone is increased, the size of the corresponding time slot in the vectoring stream is increased in order to accommodate the larger-sized symbols for the tone. By allowing the sizes of least some of the time slots to be decreased when possible depending on the bit loading used, the bandwidth of the vectoring stream can be significantly reduced relative to an embodiment that has a fixed time slot size.

FIG. 1 depicts an exemplary embodiment of a communication system 10. As shown by FIG. 1, the system 10 comprises a network 12, such as the public switched telephone network (PSTN) or other communication network, configured to communicate with CPE 15 at one or more customer premises 21. In this regard, the network 12 is coupled to a network access point 25 via a network line 27, such as one or more twisted-wire pairs or optical fibers, and the network access point 25 is coupled to the CPE 15 via a plurality of subscriber lines 29, such as twisted-wire pairs of a telephone cable. For simplicity, FIG. 1 depicts four subscriber lines 29, but there can be any number of subscriber lines 29 in other embodiments. Further, the lines 29 in FIG. 3 extend to multiple customer premises 21, but it is also possible for the lines 29 to extend to a single customer premises 21.

In a downstream direction, the network access point 25 receives a high-speed data stream from the network 12 via the network line 27 and forwards packets from the high-speed data stream across the plurality of subscriber lines 29. In an upstream direction, the network access point 25 receives data streams from the customer premises 21 via the subscriber lines 29 and transmits packets from such data streams across the network line 27 to the network 12.

In one exemplary embodiment, the network line 27 comprises an optical fiber, and optical modulation formats are used to communicate data across the fiber. In addition, each subscriber line 29 comprises at least one twisted-wire pair, and digital subscriber line (DSL) modulation formats are used to communicate data across the subscriber lines 29. Note that there are a variety of DSL modulation formats that may be used for communicating data across the subscriber lines 29, such as asymmetric DSL (ADSL), high-bit-rate DSL (HDSL), very-high-bit-rate DSL (VDSL), and single-pair HDSL (SHDSL). For illustrative purposes, it will be assumed hereafter that the modulation format used for each subscriber line is VDSL, such as first generation VDSL or VDSL2, but it should be emphasized that other DSL and/or non-DSL modulation formats may be used in other embodiments.

Figure 2:
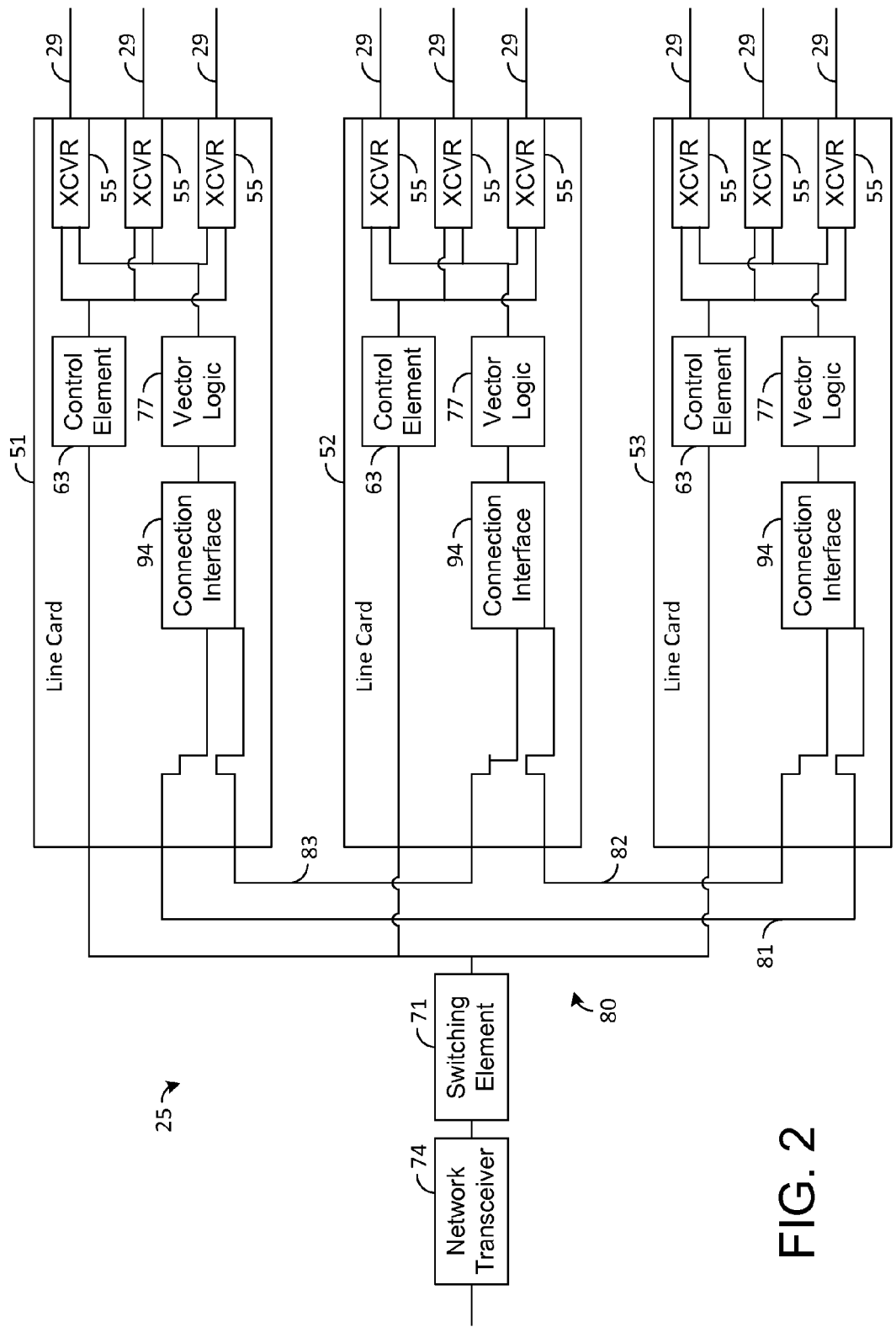
FIG. 2 is a block diagram illustrating an exemplary embodiment of a data connection with a ring topology for transferring vectoring information for the communication system of FIG. 1.

FIG. 2 depicts an exemplary embodiment of the network access point 25. The network access point 25 comprises a plurality of line cards 51-53 coupled to the subscriber lines 29. In this regard, each line card 51-53 has at least one transceiver 55 coupled to at least one subscriber line 29. In the exemplary embodiment shown by FIG. 2, each line card 51-53 has three transceivers 55 respectively coupled to three subscriber lines 29, but any line card 51-53 may have any number of transceivers 55 and/or be coupled to any number of subscriber lines 29 in other embodiments. Further, it is unnecessary for each line card 51-53 to have the same number of transceivers 55 and be coupled to the same number of subscriber lines 29 as the other line cards. As will be described in more detail hereafter, each transceiver 55 is a member of the same vectoring group, but it is unnecessary for all of the transceivers 55 to be members of the same vectoring group in other embodiments. In one exemplary embodiment, the components of the same line card reside on a single printed circuit board (PCB), but it is possible for any line card to have more than one PCB, if desired.

As shown by FIG. 2, each line card 51-53 has a card control element 63 that is coupled to each transceiver 55 residing on the same line card 51-53. The card control element 63 controls the general operation of the line card 51-53 on which it resides, including the forwarding of data packets, as will be described in more detail hereafter. The card control element 63 may be implemented in hardware, software, firmware, or any combination thereof. Each card control element 63 is also coupled to a switching element 71. Further, the switching element 71 is coupled to a network transceiver 74 that is coupled to the network line 27.

In the downstream direction, assuming that the network line 27 comprises an optical fiber, the network transceiver 74 receives an optical data signal from the network line 27 and converts the optical data signal into an electrical signal comprising data packets. The switching element 71 is configured to forward the data packets to the line cards 51-53 based on header information within the data packets using forwarding-techniques known in the art. Each data packet received by a line card 51-53 is received by the card's control element 63, which forwards the packet to at least one transceiver 55 for transmission across at least one subscriber line 29. When a transceiver 55 receives data packets from the card control element 63, the transceiver 55 modulates a carrier signal with the data packets using VDSL or some other desired modulation format in order to form a data signal that is transmitted across the subscriber line 29 coupled to such transceiver 55.

In the upstream direction, the transceivers 55 receive modulated data signals from the subscriber lines 29. For a given signal received by a given transceiver 55, the transceiver 55 demodulates the received signal to recover data packets. The transceiver 55 forwards the data packets to the card control element 63 that is residing on the same line card 51-53, and the card control element 63 forwards each packet received from the card's transceivers 55 to the switching element 71. The switching element 71 combines the packets received from all of the line cards 51-53 into a high-speed data stream, which is received by the network transceiver 74. Assuming that the network line 27 comprises an optical fiber, the network transceiver 74 converts the received data stream into an optical data signal for transmission across the network line 27 to the network 12 (FIG. 1).

As shown by FIG. 2, each line card 51-53 comprises vector logic 77 (e.g., one or more vector engines) configured to perform crosstalk vectoring in order to cancel crosstalk from the tones transmitted and/or received by the card 51-53 on which it resides. For example, the vector logic 77 of the line card 51 maintains vectoring coefficients for the tones communicated (i.e., transmitted or received) by the transceivers 55 of the card 51. Via known techniques, the vector logic 77 uses such vectoring coefficients to estimate crosstalk that affects the received tones or that will affect tones to be transmitted so that crosstalk can be cancelled.

For example, the vector logic 77 of the card 51 stores sets of vectoring coefficients respectively corresponding to the tones communicated across the subscriber lines 29 coupled to the card 51. For a given tone, referred to in this example as "victim tone," received by one of the transceivers 55 from one of the subscriber lines 29, the corresponding set of vectoring coefficients includes vectoring coefficients respectively associated with the tones, referred to as "interfering tones," that interfere with the victim tone. Upon receiving a set of symbols simultaneously communicated across the subscriber lines 29, the transceivers 55 of the card 51 send such symbols to the vector logic 77 of the card 51. For each interfering tone, the vector logic 77 combines (e.g., multiplies) the tone's symbol with the associated vectoring coefficient to estimate an amount of crosstalk interference from the interfering tone affecting the victim tone. The vector logic 77 then cancels such crosstalk interference from the symbol of the victim tone by combining (e.g., subtracting) the estimate with the symbol of the victim tone. The vector logic 77 performs the same process for the symbols of the other interfering tones in order to cancel, tone-by-tone, crosstalk interference in the victim tone.

After removing the crosstalk interference induced by the interfering tones, the vector logic 77 sends the symbol of the victim tone back to the transceiver 55 that originally received it from a subscriber line 29. Such transceiver 55 decodes the symbol and generates an error signal indicating an error estimate for the symbol. The foregoing transceiver 55 sends the error signal to the vector logic 77, which adaptively updates the set of vectoring coefficients corresponding to the victim tone based on the error signal using a known coefficient update algorithm, such as least means square (LMS).

Thus, the vector logic 77 of the card 51 cancels, from the symbol of the victim tone, crosstalk induced by each interfering tone received by the card 51 from the subscriber lines 29. In one exemplary embodiment, the vector logic 77 uses the same techniques to cancel, from the symbol of the victim tone, crosstalk induced by interfering tones received by the other line cards 52 and 53. In this regard, the set of vectoring coefficients corresponding to the victim tone also includes vectoring coefficients associated with the tones received by the cards 52 and 53. As described above for the symbols received by the card 51, the vector logic 77 combines the symbols received by the transceivers 55 of the line cards 52 and 53 with the associated vectoring coefficients to estimate the amount of crosstalk induced by such symbols in the symbol of the victim tone. The vector logic 77 also combines such estimates with the symbol of the victim tone to cancel, tone-by-tone, the crosstalk induced by the interfering tones received by the line cards 52 and 53.

Further, such vector logic 77 uses similar techniques to precode the symbols transmitted by the transceivers 55 of the card 51 across the subscriber lines 29 such that crosstalk is cancelled as the symbols propagate across the subscriber lines 29. Specifically, the vector logic 77 receives symbols of interfering tones to be communicated across the lines 29 at the same time as a symbol of a victim tone to be communicated by the line card 51. For each interfering tone, the vector logic 77 combines (e.g., multiplies) the tone's symbol with the associated vectoring coefficient to estimate an amount of crosstalk interference that will affect the symbol of the victim tone. The vector logic 77 then combines (e.g., subtracts) the estimate from the symbol of the victim tone in order to precode the symbol so that crosstalk interference from the interfering tone is effectively cancelled during communication as it couples into the line 29 of the victim tone. The vectoring coefficients used for the precoding are updated based on the error associated with the victim tone, as determined by the CP transceiver 15 (FIG. 1) that receives the victim tone. Exemplary techniques for performing crosstalk vectoring, including symbol precoding, are described in commonly-assigned U.S. patent application Ser. No. 13/016,680, entitled "Systems and Methods for Cancelling Crosstalk in Satellite Access Devices" and filed on Jan. 28, 2011, which is incorporated herein by references. Note that the vector logics 77 of the other line cards 52 and 53 are configured similar to the vector logic 77 of the line card 51 in order to cancel crosstalk affecting the tones communicated by the lines cards 52 and 53, respectively.

Moreover, in one exemplary embodiment, the vector logic 77 and transceivers 55 of the line cards 51-53 form a vectoring group such that crosstalk from any interfering tone communicated across the subscriber lines 29 can be cancelled from any victim tone communicated across the subscriber lines 29. However, in other embodiments, it is unnecessary for each vector logic 77 and each transceiver 55 at the network access point 25 to be a member of the same vectoring group.

In order to enable each line card 51-53 to cancel crosstalk induced by tones communicated by the other line cards, vectoring information (e.g., tone symbols) is passed from one card to the other. For example, to enable the vector logic 77 of the line card 51 to cancel, from a victim tone received by the line card 51, crosstalk induced by interfering tones received by the line card 53, the line card 53 transmits symbols of the interfering tones to the line card 51. Similarly, to enable the vector logic 77 of the line card 51 to precode the symbols transmitted by the transceivers 55 of the line card 51 such that crosstalk induced by interfering tones transmit by line card 53 is cancelled as the symbols propagate across the subscriber lines 29, the line card 53 transmits symbols of the interfering tones to the line card 51. In one exemplary, a ring connection 80 comprising a plurality of segments 81-83 is configured to carry vectoring information from card-to-card.

Figure 5:
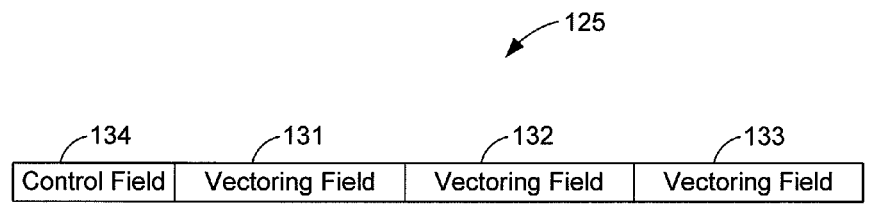
FIG. 5 is a block diagram illustrating an exemplary vectoring stream for passing vectoring information to line cards.

In one exemplary embodiment depicted in FIG. 5, the vectoring stream 125 carried by the ring connection 80 (FIG. 2) has a control field 134 and vectoring fields 131-133 that are respectively allocated to the line cards 51-53. Each vectoring field 131-133 comprises a plurality of time slots allocated to a respective one of the line cards 51-53. Further, each time slot corresponds to a tone communicated by the line card 51-53 to which the field is allocated, and such time slot carries a symbol of the corresponding tone. For example, assume that the line card 51 transmits a particular symbol across one of the subscriber lines 29 coupled to it. In order to communicate such symbol to the other line cards 52 and 53 so that these line cards 52-53 can use the symbol to perform vectoring, the line card 51 inserts the symbol into its corresponding time slot in the vectoring field 131 allocated to the line card 51. Each line card 51-53 writes its respective symbols to its allocated vectoring field and reads the symbols of the other line cards from the vectoring fields respectively allocated to the other line cards.

As shown by FIG. 2, each line card 51-53 has a connection interface 94 for controlling communication of the vectoring stream carried by the ring connection 80, including writing to and reading from the vectoring stream. The size of the vectoring stream, measured in bits, depends on the size of the symbols in the vectoring fields 131-133 and the size of the control field 134. As will be described in more detail hereafter, the sizes of the time slots are dynamically controlled depending on the sizes of the symbols being communicated. Thus, a smaller time slot size can be used for a smaller-sized symbol, thereby reducing the size of the vectoring stream. When needed, the size of a given time slot can be increased to accommodate a symbol of a larger size.

Figure 3:
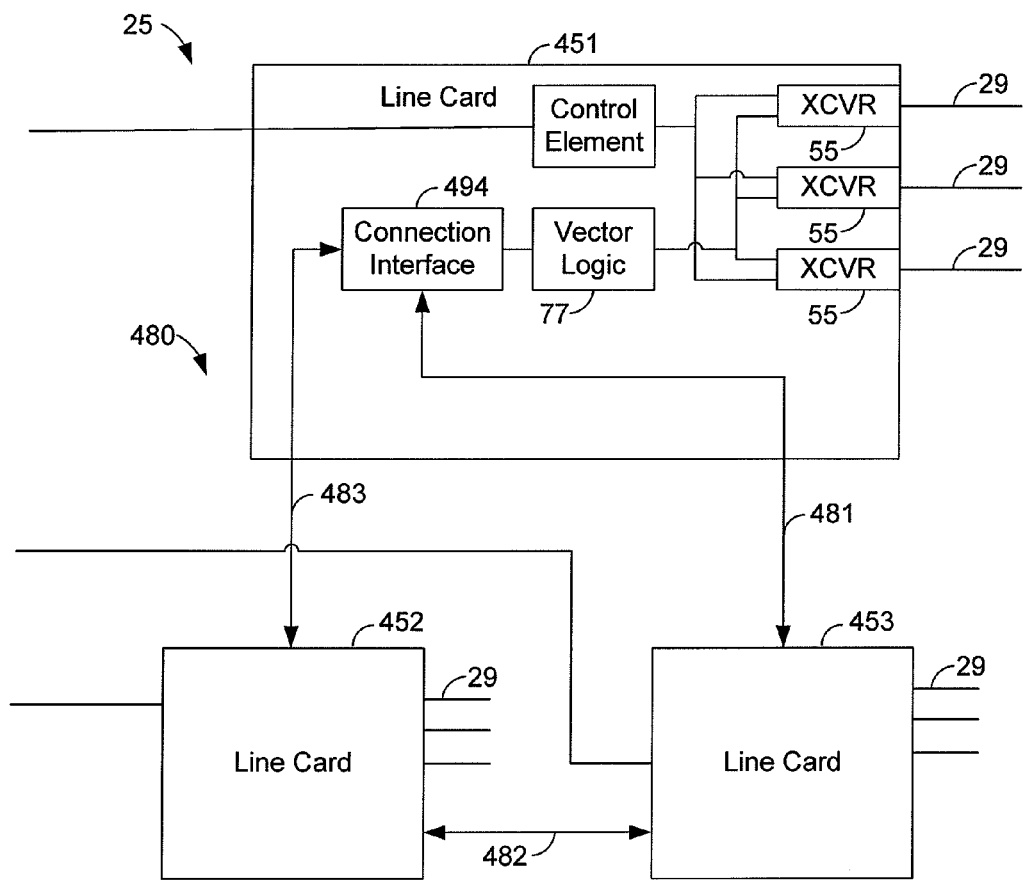
FIG. 3 is a block diagram illustrating an exemplary embodiment of a data connection with a mesh topology for transferring vectoring information for the communication system of FIG. 1.

FIG. 3 depicts an exemplary embodiment of the network access point 25 having a mesh connection 425, i.e., a data connection having a mesh topology, for passing vectoring information among a plurality of line cards 451-453. In the embodiment of FIG. 3, there are three line cards 451, 452 and 453 of a vectoring group, but other numbers of line cards are possible in other embodiments. In the mesh connection 480, line cards 451-453 are connected via segments 481-483 that transfer data in both directions. Further, each line card is coupled to each of the other lines cards of the same vectoring group via a respective segment of connection 480, and each line card transmits its respective symbols to each of the other line cards via a separate segment. For example, the line card 451 is connected to the line card 452 via one segment 483 and to line card 453 via another segment 481. The line card 451 receives vectoring information sent from the line card 452 via segment 483, and line card 451 also receives vectoring information from the line card 453 via the segment 481. In other embodiments, other numbers of line cards and connection segments are possible.

Similar to the embodiment shown by FIG. 2, each line card 451-453 has a connection interface 494 for writing to and reading from the vectoring stream carried by the connection 480. Except for the type of connection 480 used to carry the vectoring stream and the protocol for transferring vectoring information among the line cards 451-453, the operation of the multiplexer 25 shown by FIG. 3 is generally the same as that for the embodiment shown by FIG. 2.

Figure 4:
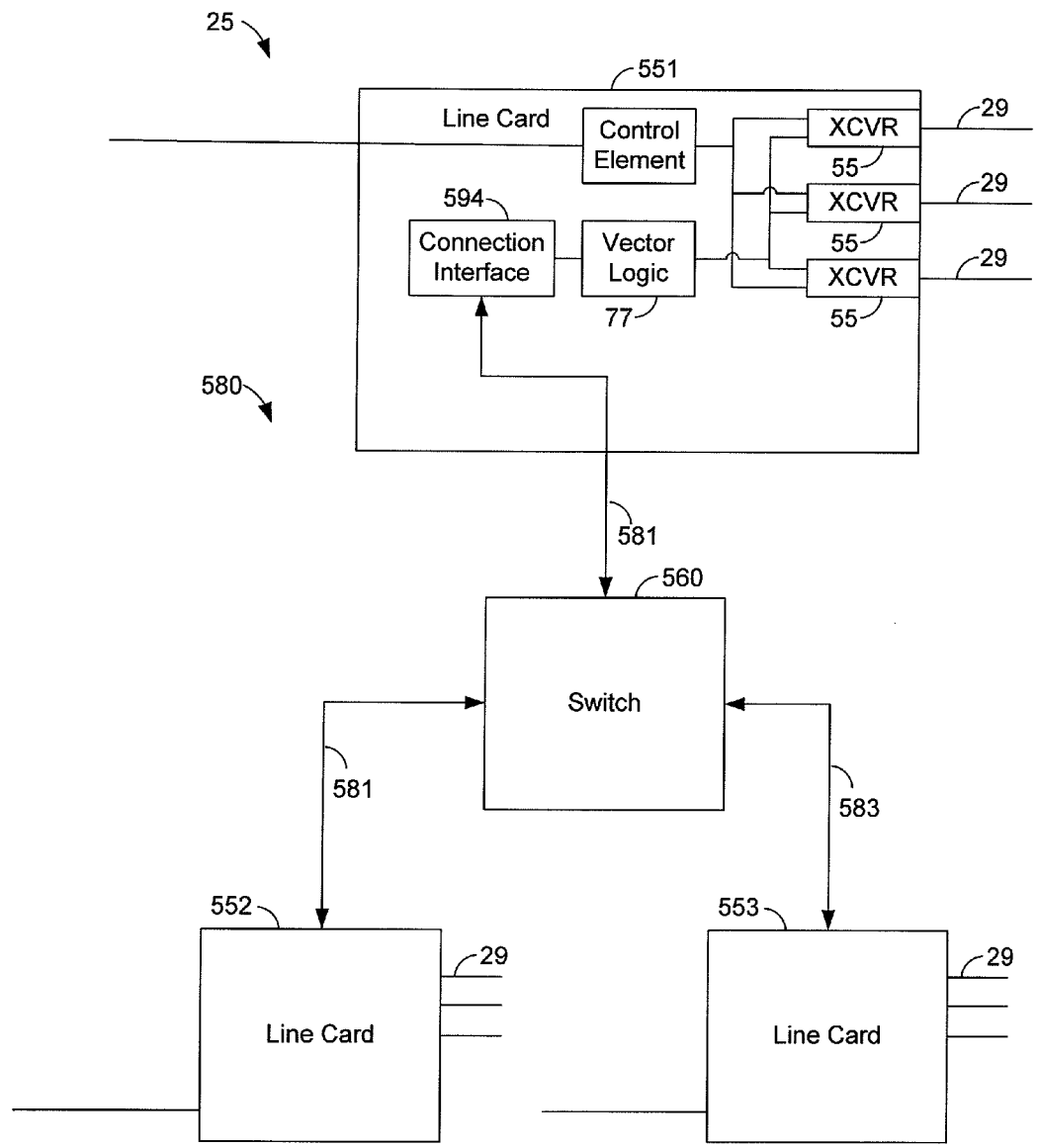
FIG. 4 is a block diagram illustrating an exemplary embodiment of a data connection with a switch topology for transferring vectoring information for the communication system of FIG. 1.

FIG. 4 depicts an exemplary embodiment of the network access point 25 with a switch connection 580, i.e., a data connection with a switch topology, for passing vectoring information to line cards. In the embodiment of FIG. 4, three line cards 551, 552 and 553 of a vectoring group are coupled to a switch 560. Each line card 551-553 is coupled to the switch 560 over a respective connection 581-583 where data is transferred in both directions. The switch 560 receives vectoring information from the line cards 551-553 and selectively forwards the vectoring information so that each line card receives the symbols provided by the other line cards. For example, the line card 551 sends to the switch 560 the symbols to be transmitted across the subscriber lines 29 by the line card 551 and the symbols received by the line card 551 from the subscriber lines 29. The switch 560 forwards such symbols to the line cards 552 and 553 so that each line card 552 and 553 has access to the symbols of the line card 551. Except for the type of connection 480 used to carry the vectoring stream and the protocol for transferring vectoring information among the line cards 551-553, the operation of the multiplexer 25 shown by FIG. 4 is generally the same as that for the embodiment shown by FIG. 2.

To better understand how vectoring information is exchanged between line cards, consider the network access point 25 depicted in FIG. 2. In one exemplary embodiment, the vectoring stream 125 is transmitted across the ring connection 80 from card-to-card in the same direction around the ring formed by the ring connection 80 and cards 51-53. For example, referring to FIG. 2, the vectoring stream 125 may be transmitted from the line card 51 to the line card 52 via the segment 83, from the line card 52 to the line card 53 via the segment 82, and from the line card 53 to the line card 51 via the segment 81. Alternatively, the vectoring stream 125 may be transmitted from the line card 51 to the line card 53 via the segment 81, from the line card 53 to the line card 52 via the segment 82, and from the line card 52 to the line card 51 via the segment 83. In other embodiments, other techniques for communicating the vectoring stream 125 are possible. For example, it is possible for the vectoring stream 125 to be transmitted in both directions, or for one portion of the vectoring stream 125 to be transmitted in one direction while another portion of the vectoring stream 125 is transmitted in the opposite direction. For illustrative purposes, it will be assumed hereafter that the vectoring stream 125 is transmitted in the same direction, clockwise, around the ring unless otherwise noted.

As an example, as described above, the line card 51 is configured to insert into its allocated field 131 vectoring information comprising symbols communicated by the transceivers 55 of the card 51. As the vectoring stream 125 propagates along the ring connection 80, the connection interface 94 of the card 52 receives the vectoring field 131 allocated to the line card 51 and passes the vectoring information from such field 131 to the vector logic 77 of the line card 52, which uses such information in performing vectoring operations. When the connection interface 94 of the line card 52 receives the vectoring field 132 allocated to such card 52, the interface 94 overwrites the vectoring information in the field 132 with symbols (e.g., symbols to be transmitted by the card 52 across the subscriber lines 29 and/or symbols received by the card 52 from the subscriber lines 29).

As described above, each time slot corresponds to a respective tone communicated across the subscriber lines 29 by a respective one of the cards 51-53. Symbols for the corresponding tone are inserted into a given time slot for communication across the connection 80. Further, the times slots are transmitted in the same sequence across the connection 80 so that each connection interface 94 can determine to which tone a time slot corresponds based on the time slot's order in the sequence. That is, the vectoring stream has a defined frame format known by each connection interface 94 of the cards 51-53. As an example, the first time slot of vectoring field 131 might correspond to a given tone ("Tone A") transmitted by the line card 51 across a subscriber line 29. Each time the vectoring field 131 is received by the line card 51, the connection interface 94 of the line card 51 writes to the first time slot a symbol that is about to be used by the line card 51 to modulate the corresponding tone (i.e., Tone A in this example). Each time the vectoring field 131 is received by another line card 52 or 53, the connection interface 94 of such line card 52 or 53 reads the foregoing time slot and associates the symbol from such time slot with Tone A based on the time slot's sequence in the vectoring stream. Such symbol is the then used in a vectoring operation to precode a symbol that will be affected by crosstalk from Tone A.

Figure 6:
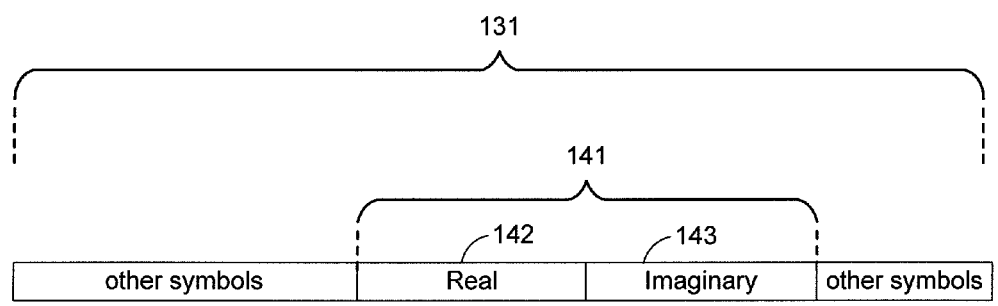
FIG. 6 is a block diagram illustrating an exemplary vectoring field for the vectoring stream of FIG. 6.

Symbols often have a fixed size, such as when a corresponding constellation of the symbol is represented by a real component and an imaginary component of a fixed number of bits. For example, a VDSL2 communication system may have a symbol size of 32 bits where 16 bits represent both the real and the imaginary component of the corresponding symbol. FIG. 6 depicts an exemplary field 131 of a vectoring stream 125 having time slots 141 in which symbols having real bits 142 and imaginary bits 143 are inserted.

To better understand the data bandwidth to pass vectoring information between line cards 51-53 by a vectoring stream 125, consider the following example for downstream communication. For a VDSL2 communication system, there may be 4089 downstream tones available in each transceiver 55 for modulation by symbols. Since each tone may be used by the transceiver 55 of a line card, then there may be 4089 symbols to be passed from each transceiver 55 of a line card to the other line cards. If a symbol has a size of 32 bits, then a given line card may send 130,848 bits (4089 symbols X 32 bits per symbol) for each of the card's transceivers 55 to the other line cards for each transmission cycle. Since the transmission cycle for VDSL2 is 4,000 transmissions per second, each transceiver 55 of a line card may require a data bandwidth of around 523 Megabits per second. Since a fully populated access device may have 192 transceivers, the data bandwidth required for sending symbols could be around 100 Gigabits per second. For a ring connection as shown in FIG. 2, several channels may be aggregated, such as for example, ten Ethernet channels of 10 Gigabits each, in order to form a data connection capable of transmitting 100 Gigabits per second.

Figure 7:
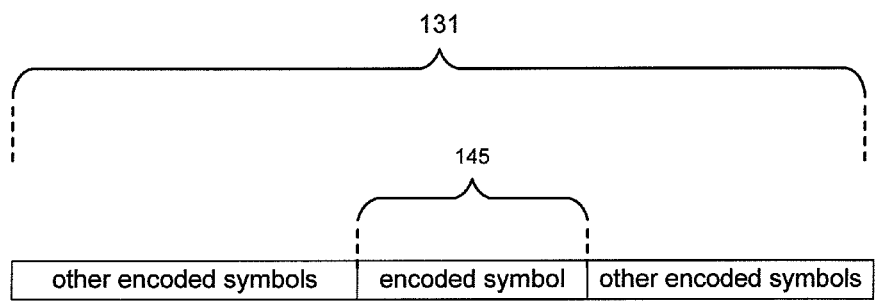
FIG. 7 is a block diagram illustrating an exemplary vectoring field for the vectoring stream of FIG. 6.

In one exemplary embodiment, each connection interface 94, when writing a symbol to a given time slot of the vectoring steam, is configured to encode the symbol in order to reduce its size. That is, the connection interface 94 maps the symbol to a representation having a fewer number of bits. FIG. 7 depicts an exemplary field 131 of a vectoring stream 125 having time slots 141 in which encoded symbols are inserted. When the number of bits representing a symbol is reduced, the width of the time slot for that symbol in the vectoring stream 125 may be reduced accordingly, thereby decreasing the overall size of the vectoring stream 125. The vector logic 77 of each line card 51-53 is preferably aware of the mappings used for encoding so that any encoded symbol in the vectoring stream 125 can be decoded by the vector logic 77 of any of the line cards 51-53. When a line card receives a vectoring field allocated to another line card, the vector logic 77 of the receiving line card is configured to decode each encoded symbol of such field, thereby recovering the symbols originally encoded by the line card to which the field is allocated. The recovered symbols may then be used for vectoring operations.

An exemplary embodiment of an encoding process will now be described for a VDSL2 communication system. For a VDSL2 communication system, symbols may have a size of 32 bits. Because the number of 32-bit symbols used in VDSL2 may be represented by 16 bits, a one-to-one correspondence between symbols of 32 bits and 16-bit identification numbers can be generated and stored in a table, referred to hereafter as "encoding table." That is, each 32-bit symbol is mapped to a respective 16-bit identification number in the encoding table. In one exemplary embodiment, the encoding table is stored on each line card 51-53 and is accessible by the vector logic 77 that resides on the same card.

Encoding is accomplished by using the 32 bits of the symbol as an index value to lookup a 16-bit identification number (e.g., a 16-bit number defining the data value represented by the symbol). Such 16-bit identification number may be inserted into the vectoring stream in lieu of the 32-bit representation of that symbol in order to reduce the bandwidth of the vectoring stream. Conversely, decoding is accomplished by using the 16-bit identification number from the vectoring stream as an index value to lookup the corresponding 32-bit representation of the symbol in the encoding table. The encoding as described above allows a symbol of size 32 bits to be converted to a symbol identification number of 16 bits. In other embodiments, other bit lengths for the encoded and/or decoded symbols are possible.

In one exemplary embodiment, the number of bits for the encoded symbol is further reduced based on the bit loading that is used for the tone that communicates the encoded symbol. Specifically, the size of the encoded symbol read from the encoding table is preferably selected based on such bit loading. As known in the art, bit loading for a tone generally refers to the number of data bits that are communicated per symbol and, thus, the tone's constellation density. When the bit loading for a tone decreases (thereby reducing constellation density), the number of bits required to represent the encoded symbols for the tone also decreases. That is, all possible encoded symbols for a tone having a lower constellation density can be represented with a fewer number of bits.

In one exemplary embodiment, the vector logic 77 on each card 51-53 stores and maintains a table, referred to herein as a "bit loading table," indicating the bit loading for each tone in the vectoring group, including tones communicated by other line cards. Further, each transceiver 55 notifies the vector logic 77 on the same line card when it adjusts the bit loading of any tone. In response to such notification, the vector logic 77 updates its bit loading table, and notifies the vector logic 77 on the other line cards of the bit loading change using the control field 134 of the vectoring stream 125. Thus, the vector logic 77 on each line card 51-53 should be aware of the bit loading that is currently used for each tone in the vectoring group. For each such tone, the vector logic 77 determines, based on the tone's current bit loading value in its bit loading table, the minimum number of bits that are required to represent all possible encoded symbols for that tone (referred to hereafter as "minimum encoded symbol length"). As described above, the minimum encoded symbol length for any given tone generally decreases as the tone's bit loading decreases since smaller bit loading for a tone generally decreases the total number of possible encoded symbols for the tone. The vector logic 77 is configured to encode symbols of the tone for insertion into the vectoring stream 125 based on the tone's minimum encoded symbol length.

As an example, assume that the vector logic 77 of a line card 51-53 determines that the minimum encoded symbol length for a given tone is 6 bits based on the tone's current bit loading. When encoding a symbol for that tone, the vector logic 77 maps the symbol to a 16-bit identification number in its encoding table by using the symbol as a key to lookup the corresponding 16-bit identification number. Since the minimum encoded symbol length for the tone in this example is 6 bits, the 10 most significant bits of the corresponding 16-bit identification number are not needed in order to uniquely identify the encoded symbol relative to other encoded symbols that could be used for the tone. Thus, the vector logic 77 reads or otherwise uses only the 6 least significant bits of the corresponding 16-bit identification number in order to define the encoded symbol. As described above, this 6-bit encoded symbol is passed to the connection interface 94 on the same line card, and the connection interface 94 inserts the encoded symbol into the corresponding time slot of the vectoring stream 125.

Preferably, the size of each time slot is dynamically adjusted in order to accommodate the sizes of the encoded symbols inserted therein. In an effort to reduce the data requirements of the vectoring stream 125, the size of each time slot is adjusted to match the minimum encoded symbol length for the corresponding tone. For example, if the minimum encoded symbol length for a tone is reduced to 6 bits due to the tone's current bit loading, as described above, then the width of the corresponding time slot in the vectoring stream 125 is preferably reduced to 6 bits as well. If the minimum symbol length is later changed, then the width of the corresponding time slot is preferably also changed such that it matches the new minimum symbol length for the tone.

Note that, in some situations, a tone may be excluded from data communication, such as when the line conditions for such tone deteriorate too significantly to support data communication. In such case, the time slot corresponding to such a tone can be removed entirely from the vectoring stream 125, such that the vectoring stream 125 only includes time slots corresponding to tones that are actively used for communication. To accommodate the changing time slot widths, including the removal of time slots corresponding to inactive tones, a flexible framing format permitting dynamic adjustment of time slot widths is preferably used. There are various techniques that can be used to effectuate a flexible framing format.

In one exemplary embodiment, the connection interface 94 of each line card 51-53 maintains a value, referred to herein as "size indicator," for each time slot in the vectoring fields 131-133. Each such size indicator corresponds to a respective time slot and indicates the size (e.g., number of bits) of the time slot. Using such size indicators and the predefined sequence of time slots according to the frame format, the connection interface 94 can discern which data in the vectoring stream 125 defines which time slot.

When the vector logic 77 of a line card 51-53 updates the card's bit loading table in response to a bit loading change in the vectoring group, the vector logic 77 calculates a new minimum encoded symbol length for the affected tone based on the tone's new bit loading and informs the connection interface 94 on the same card of such new minimum encoded symbol length. If this minimum encoded symbol length newly calculated by the logic 77 is different than the current width of the corresponding time slot, as indicated by the slot's size indicator, then the connection interface 94 updates such size indicator so that it matches the minimum encoded symbol length calculated by the vector logic 77. Note that, since the bit loading table at each line card 51-53 is updated in response to a bit loading change, the size indicator for the time slot at each line card 51-53 should be updated when the bit loading of the corresponding tone changes. Moreover, updating the size indicators of a time slot has the effect of changing the time slot's width since the size indictors define a portion of the flexible frame format used by the line cards 51-53 to communicate the vectoring stream 125.

Note that if a given tone is excluded from communication or in other words inactive, as described above, such that it is not used for data transmission, then the size indicator for the corresponding time slot may be updated in a similar manner, as described above, to indicate that the corresponding time slot is effectively removed from the vectoring stream 125. As an example, a zero value (or some other predefined value) may be used for the size indicator in such a situation. If an excluded tone is later used for communication, then the size indicator for the tone's corresponding time slot may be updated based on the tone's bit loading to indicate the slot's width, thereby indicating that such time slot is now included in the vectoring stream 125.

It should be further noted that encoding and/or dynamic selection of time slot sizes, as described above, may be implemented for embodiments having various types of data connections, such as the mesh connection 480 and the switch connection 580 of FIGS. 3 and 4.

Figure 8:
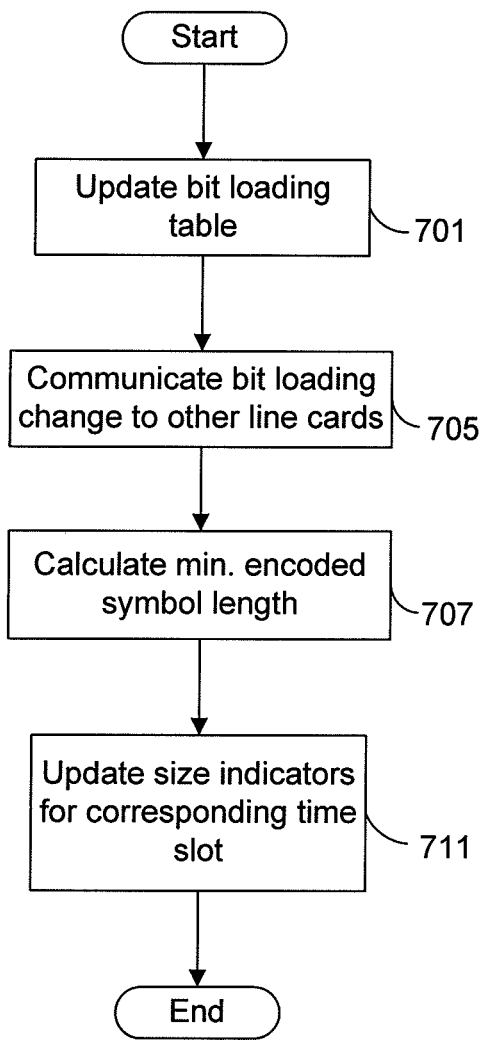
FIG. 8 is a flowchart illustrating an exemplary method for handling a bit loading change for a tone such that the vectoring stream width of a time slot corresponding to the tone is dynamically changed based on the bit loading change.

An exemplary method for sending a symbol from a line card, such as line card 51, to another line card, such as line card 52, is depicted in FIG. 8. Assume that a transceiver 55 of the line card 51 has a symbol to be transmitted across a subscriber line 29. Prior to modulating a tone (referred to hereafter as "Tone B") with the symbol for transmission, the transceiver 55 sends the symbol to the vector logic 77 of the line card 51 for precoding. The vector logic 77 precodes such symbol based on the symbols of interfering tones and returns the precoded symbol to the transceiver 55 for transmission across the subscriber line 29. Before returning the precoded symbol, the vector logic 77 also encodes the symbol to provide an encoded symbol that is to be communicated to the other line cards 52 and 53.

For illustrative purposes, assume that the vector logic 77 maps the symbol to a 16-bit value of 0000011010011101 via its encoding table, and assume that the minimum encoded symbol length for Tone B, based on the bit loading for such tone, is 12 bits. In such example, the vector logic 77 encodes the symbol into a 12-bit encoded symbol of 011010011101 and passes such 12-bit encoded symbol to the connection interface 94 of the card 51 for insertion into the vectoring stream 125. Thereafter, upon receiving the vectoring field 131 allocated to the line card 51, the connection interface 94 inserts the encoded symbol into the time slot of the field 131 corresponding to Tone B (i.e., the tone that is to carry the encoded symbol).

The connection interface 94 of the line card 52 eventually receives the vectoring field 131 of the vectoring stream 125. Based on the frame format, as indicated in part by the size indicators defining the respective widths of the time slots, the connection interface 94 of the line card 52 finds and reads the time slot carrying the encoded symbol inserted by the line card 51. The interface 94 decodes the encoded symbol and passes the decoded version of the symbol to the vector logic 77 of the line card 52, which precodes at least one symbol to be transmitted from the line card 52 based on the decoded symbol received from the line card 51, thereby compensating such precoded symbol for crosstalk from Tone B. This precoded symbol to be transmitted from the line card 52 may be precoded based on the symbols of other interfering tones as well. After precoding, the vector logic 77 sends the precoded symbol to the transceiver 55 of the line card 52 that is to transmit it. Such transceiver 55 modulates a tone with the precoded symbol for communication across the subscriber line 29 coupled to it. As the tone propagates across the subscriber line 29, crosstalk from interfering tones, including Tone B, couples into such line 29 and is cancelled due to the precoding performed by the vector logic 77.

Thereafter, assume that the transceiver 55 of the line card 51 communicating Tone B changes the bit loading of Tone B to 10 bits due to a decrease in the SNR ratio for such tone. Such transceiver 55 preferably notifies the vector logic 55 of line card 51, and such vector logic 77 updates its bit loading table to reflect the change, as shown by block 701 of FIG. 8. The vector logic 77 also communicates the change to the other line cards 52 and 53 via the control field 134 of the vectoring stream 125, as shown by block 705 of FIG. 8, and the vector logic 77 of the other line cards 52 and 53 similarly update their bit loading tables. In response to the updates to the bit loading tables, the vector logic 77 of each card 51-53 calculates a minimum encoded symbol length indicating that the minimum number of bits presently required to represent all possible encoded symbols of Tone B in view of its current bit loading is 10, as shown by block 707 of FIG. 8. The vector logic 77 of each card 51-53 notifies the connection interface 94 on the same card of the new minimum encoded symbol length, and each communication interface 94 updates its respective size indicator for the time slot corresponding to Tone B from a value of 12 to a value of 10 effectively changing the width of the corresponding time slot to 10 bits, as shown by block 711 of FIG. 8.

Thereafter, when the vector logic 77 of the line card 51 receives a new symbol for Tone B, the vector logic 77 encodes the symbol to a 10-bit encoded symbol. Further, the vector logic 77 communicates such 10-bit encoded symbol to the other line cards 52 and 53 via the time slot of the vectoring stream 125 corresponding to Tone B, as described above. However, at this point, the width of such time slot has been changed from 12 bits to 10 bits since such reduced width is sufficient for communicating encoded tones of Tone B in view of Tone B's new bit loading.

It should be emphasized that the embodiments described above are exemplary, and various changes and modifications to the described embodiments would be apparent to a person of ordinary skill upon reading this disclosure.

Now, therefore, the following is claimed:

1. A system for exchanging vectoring information between line cards of a vectoring group, comprising:
    a data connection;
    a first line card coupled to a first plurality of subscriber lines and configured to communicate discrete multi-tone (DMT) signals across the first plurality of subscriber lines, the first line card coupled to the data connection and configured to transmit a vectoring stream across the data connection, the vectoring stream having a plurality of time slots respectively corresponding to tones communicated by the first line card, the first line card configured to insert a symbol into one of the time slots corresponding to a tone communicated by the first line card, wherein the first line card is further configured to dynamically adjust a size of the one time slot in response to a change in bit loading for the tone corresponding to the one time slot; and
    a second line card coupled to a second plurality of subscriber lines and configured to communicate DMT signals across the second plurality of subscriber lines, the second line card coupled to the data connection, the second line card further configured to receive the vectoring stream from the data connection and to perform vectoring based on the symbol, thereby compensating at least one symbol communicated by the second line card for crosstalk,
    wherein the first line card is configured to transmit to the second line card control information indicative of the size of the one time slot.

2. The system of claim 1, wherein the symbol inserted into the one time slot is encoded, and wherein the second line card is configured to decode the symbol inserted into the one time slot.

3. The system of claim 1, wherein the data connection has a ring topology.

4. The system of claim 1, wherein the data connection has a mesh topology.

5. The system of claim 1, wherein the data connection has a switch topology.

6. A method for exchanging vectoring information between line cards of a vectoring group, comprising:
    communicating tones across a plurality of subscriber lines coupled to a first line card;
    communicating tones across a plurality of subscriber lines coupled to a second line card;
    transmitting a vectoring stream across a data connection from the first line card to the second line card, the vectoring stream having a plurality of time slots respectively corresponding to the tones communicated across the plurality of subscriber lines coupled to the first line card;
    inserting, into one of the time slots, a symbol for one of the tones communicated across the plurality of subscriber lines coupled to the first line card;
    dynamically adjusting a size of the one time slot in response to a change in bit loading for the one tone;
    receiving the vectoring stream at the second line card;
    performing vectoring based on the symbol, thereby compensating at least one symbol communicated by the second line card for crosstalk; and
    transmitting control information from the first line card to the second line card, the control information indicative of the size of the one time slot.

7. The method of claim 6, further comprising:
    encoding, at the first line card, the symbol inserted into the one time slot; and
    decoding, at the second line card, the symbol inserted into the one time slot.

8. The method of claim 6, wherein data connection has a ring topology.

9. The method of claim 6, wherein the data connection has a mesh topology.

10. The method of claim 6, wherein the data connection has a switch topology.

11. The method of claim 6, wherein the control information is transmitted via the vectoring stream.

12. The system of claim 1, wherein the first line card is configured to transmit the control information via the vectoring stream.

13. The system of claim 1, further comprising a third line card coupled to a third plurality of subscriber lines and configured to communicate DMT signals across the third plurality of subscriber lines, wherein the vectoring stream has a plurality of time slots respectively corresponding to tones communicated by the third line card.

* * * * *